(12) United States Patent
Kaefer et al.

(10) Patent No.: US 7,945,820 B2
(45) Date of Patent: May 17, 2011

(54) METHOD AND APPARATUS FOR ELIMINATION OF FAULTS OF A DATA PROCESSING SYSTEM

(75) Inventors: Gerald Kaefer, Munich (DE); Christoph Koenig, Ottobrunn (DE)

(73) Assignee: Fujitsu Siemens Computers GmbH, Munich (DE)

( * ) Notice: Subject to any disclaimer, the term of this patent is extended or adjusted under 35 U.S.C. 154(b) by 372 days.

(21) Appl. No.: 12/107,619

(22) Filed: Apr. 22, 2008

(65) Prior Publication Data
US 2008/0201601 A1 Aug. 21, 2008

Related U.S. Application Data

(63) Continuation of application No. PCT/EP2007/004589, filed on May 23, 2007.

(30) Foreign Application Priority Data

May 23, 2006 (DE) .......................... 10 2006 024 232

(51) Int. Cl.
*G06F 11/00* (2006.01)
(52) U.S. Cl. ........................................... 714/57; 714/25
(58) Field of Classification Search .................. None
See application file for complete search history.

(56) References Cited

U.S. PATENT DOCUMENTS

| | | | |
|---|---|---|---|
| 5,107,500 A | 4/1992 | Wakamoto et al. | |
| 6,219,805 B1 * | 4/2001 | Jones et al. | 714/38 |
| 6,681,344 B1 | 1/2004 | Andrew | |
| 6,697,969 B1 * | 2/2004 | Merriam | 714/46 |
| 6,738,933 B2 * | 5/2004 | Fraenkel et al. | 714/47 |
| 6,785,834 B2 * | 8/2004 | Chefalas et al. | 714/4 |
| 7,093,169 B2 * | 8/2006 | Merriam | 714/47 |
| 7,281,170 B2 * | 10/2007 | Taylor et al. | 714/48 |
| 7,334,028 B2 | 2/2008 | Flocken et al. | |
| 7,487,409 B2 * | 2/2009 | Atherton et al. | 714/57 |
| 2003/0135592 A1 | 7/2003 | Vetter et al. | |
| 2006/0242286 A1 | 10/2006 | Hawkins et al. | |
| 2007/0239628 A1 * | 10/2007 | Peck et al. | 706/11 |
| 2007/0260941 A1 * | 11/2007 | Omi | 714/48 |
| 2007/0277061 A1 * | 11/2007 | Ashe | 714/57 |
| 2010/0174952 A1 * | 7/2010 | Anastas et al. | 714/57 |

FOREIGN PATENT DOCUMENTS

EP 1 480 128 A2 11/2004

* cited by examiner

*Primary Examiner* — Michael C Maskulinski
(74) *Attorney, Agent, or Firm* — Slater & Matsil, L.L.P.

(57) ABSTRACT

A method for fault handling of a data processing unit is disclosed. The method includes automatic acquisition of input information and/or output information of a user at at least one user interface of the data processing unit; automatic detection of a fault message that indicates a fault of the data processing unit; transmission of the acquired fault message together with the input information and/or the output information to a fault handling center; and evaluation of the transmitted fault message in the fault handling center.

17 Claims, 3 Drawing Sheets

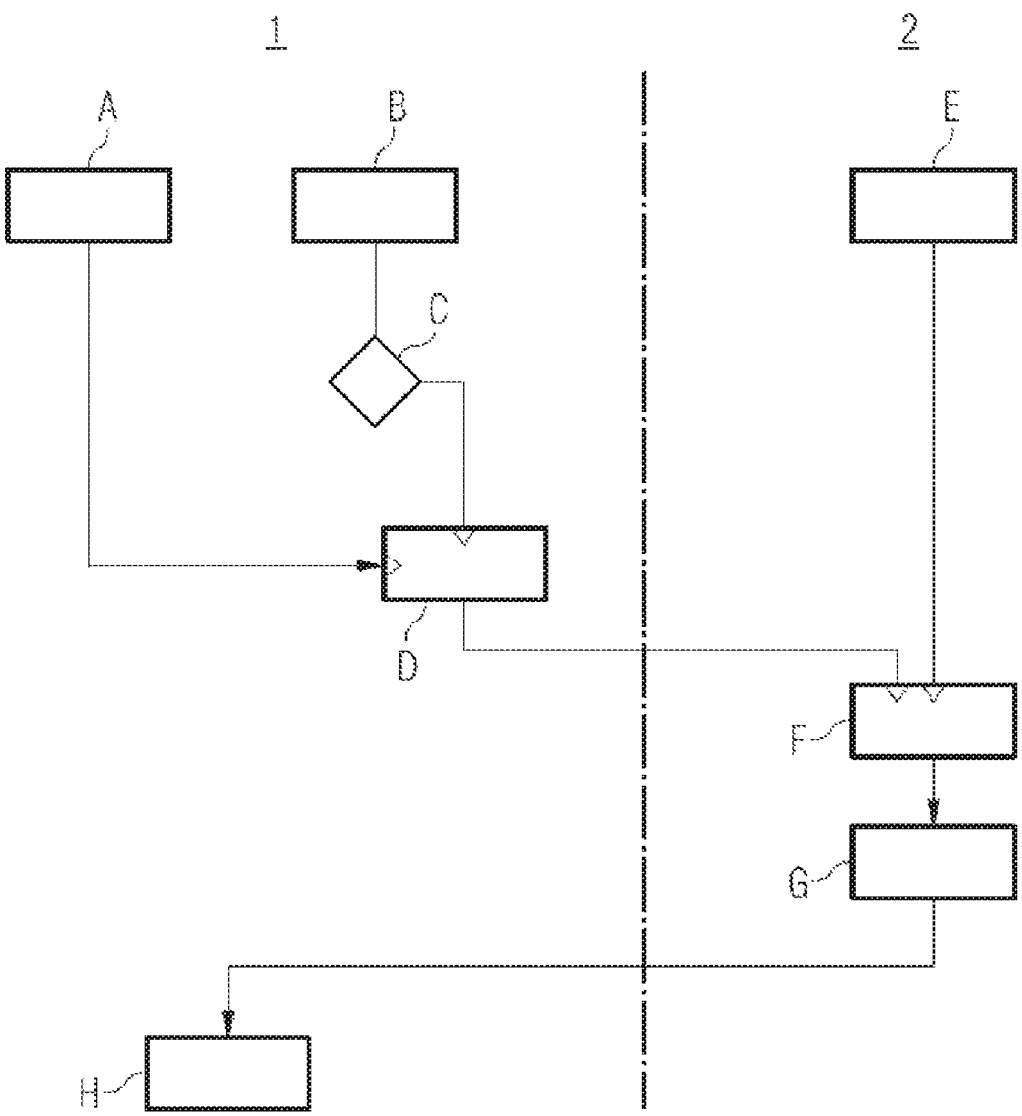

METHOD AND APPARATUS FOR ELIMINATION OF FAULTS OF A DATA PROCESSING SYSTEM

This application is a continuation of co-pending International Application No. PCT/EP2007/004589, filed May 23, 2007, which designated the United States and was not published in English, and which is based on German Application No. 10 2006 024 232.7 filed May 23, 2006, both of which applications are incorporated herein by reference.

TECHNICAL FIELD

Embodiments of the present invention relate to a method and apparatus for the elimination of faults of a data processing unit.

BACKGROUND

Computers are used for a variety of applications, including office work, controllers of production systems and robots. This requires the interaction of a great variety of devices and software components in the computer system in question. New devices or software components are also dynamically integrated into the computer system according to requirements. In this case, undesired behavior of the computer systems can appear for a wide variety of reasons. Typical causes are incompatibilities of individual devices or software components, or an erroneous setup of these devices or components.

Service providers offer to eliminate this undesirable behavior. Typically, a service center is contacted after the appearance of undesirable behavior, and attempts in a brief telephone conversation to obtain specific information about the undesirable behavior and to determine or at least narrow down the possible causes. It is indispensable to transfer the configuration data of a computer system and the detailed error messages to the service center. In error messages, information in the form of text or error codes, or even instantaneous memory contents, is typically transferred. Log files compiled by the computer system or the programs that have been run can also be transferred.

Some software programs cannot generate log files or output error messages relating to the computer system. These include many Web-based or terminal-based applications, or applications that run in a particularly encapsulated environment. For security reasons, these programs are not granted any write privileges. For these applications, however, this has the undesired effect that support and narrowing down of the causes of the malfunction by means of a telephone call or a decentralized service center is considerably more difficult when the malfunction appears, owing to the lack of log files or the like.

SUMMARY OF THE INVENTION

In one aspect, the present invention provides an improved method for eliminating faults in a computer system.

To handle faults of a data processing unit, the method of one embodiment of the invention provides for the acquisition of input information and/or output information of the user at a user interface, also called user interface, of the data processing unit. A fault message that indicates a fault of the data processing unit is also acquired. The acquired fault message together with the input information and/or the output information is transmitted to a fault handling center. The transmitted fault message is evaluated in the fault handling center by providing a plurality of predetermined patterns and a plurality of fault handling routines associated with the predetermined patterns. The patterns that are contained in the input information and/or the output information are selected from the plurality of predetermined patterns. The fault handling center can acquire, from a plurality of error handling routines, the error handling routine associated with the selected samples. The acquired error handling routines are then transmitted to the data processing unit in order to handle the fault.

One idea underlying the invention is to acquire information input by a user into the data processing unit or information output by the data processing unit to a user in the manner in that they present themselves to the human user or are input by a human (for instance as language). The information is acquired at a user interface on the user or human side. The information is thus present before a conversion of input or of input information by the user interface; or an output or output information of the data processing unit to the user has taken place via the user interface, and the information is thus present as information acquirable by the user. Inventive embodiments provide for the acquisition of input information and/or output information from several user interfaces as well.

Information, input information or output information of a user interface refers within the scope of the present description to data in a form in which it is acquirable by a human. For this purpose, data is present in a form that is visually, acoustically or haptically acquirable.

A suitable error handling routine is obtained from this information by the various embodiment methods of the invention.

One advantage of the embodiments of the invention is that the input information and/or output information frequently contains indications of how a fault could have been caused. This comprises, for instance, an erroneous input by the user. The method of the invention is particularly advantageous if the application or computer program product that has been run is being run in an encapsulated environment that does not permit any storage of log files for the determination of faults. In this embodiment, the method of the invention can be executed in parallel to the application in order to provide an error handling routine for the application in case a fault appears.

The fault message can be generated manually by a user by selecting a help function, or automatically by an application if the latter contains appropriate assessing algorithms or recognition algorithms for an appearance of a fault.

The fault handling center can be integrated into the data processing unit as an autonomous computer program product, but the fault handling center is advantageously a central unit to which a number of data processing units are connected. By central acquisition of the fault messages or information, the administration costs for the data processing units can be lower on average.

In another embodiment, the present invention provides an apparatus with a number of units. At least one acquisition unit can be used for acquiring input information and/or output information of a user at a user interface of the data processing unit. A fault acquisition unit can be used for acquiring a fault message that indicates a fault of the data processing. A first interface can be used for transmitting the acquired fault message together with the input information and/or the output information to a fault handling center. An evaluation unit in the fault handling center can be used for evaluating the transmitted fault message. A database in the fault handling center provides a plurality of predetermined patterns and a plurality of error handling routines associated with the predetermined patterns. At least one pattern recognition unit for selects the patterns that are contained in the input information and/or the output information from the plurality of predetermined patterns and a second interface transmits the acquired error handling routine to the data processing unit in order to handle the fault.

Refinements and implementations of the present invention are specified in the disclosure either explicitly or so as to be otherwise understood by one of skill in the art.

In one implementation, the output information is required as raw data and/or the output information is acquired as it is output by the user interface.

In one refinement, the transmitted error handling routine is executed by the data processing unit. In this way, an automatic elimination of the fault can be achieved. Alternatively, the user can be given information as to how he can eliminate the fault.

In one refinement, the transmitted fault message and the input information and/or the output information are stored in a database of the fault handling unit. The stored fault messages can be drawn upon for an evaluation of the quality of the computer program product. Additionally, a system notification can be output if the most recently transmitted fault message does not correspond to the input information and/or the output information of any of the previously stored fault messages. Upon notification to the system, an appropriate service person is instructed to develop and make available an error handling routine for this most recently transmitted fault message.

In one implementation, the representation of a display unit of the data processing unit is acquired as visual output information, the text content of the visual output information is acquired by means of a text recognition unit, and the error handling routine whose associated text-based pattern is contained in the text content is acquired.

In another implementation, the voice input is acquired as acoustic input information, the text content is acquired from the acoustic input information by means of a speech recognition unit, and the error handling routine whose associated acoustic pattern is contained in the text content is acquired.

According to one refinement, the text content is translated by means of a translation machine into a standard language in order to acquire the pattern contained in the text content.

In another implementation, the related text-based pattern corresponding to an error handling routine is provided in different languages.

In one implementation, the representation of a display in the data processing center is acquired as visual output information; the error handling routine whose associated graphical pattern in the visual output information is confirmed by a pattern recognition unit is acquired. In this way, graphical elements can also be used in an advantageous manner for error analysis and fault handling.

In one refinement, the first interface between the data processing unit and the fault handling center provides an encrypted connection. This is particularly important if sensitive data may be contained in the input information and/or the output information. This could be, for example, cost calculations that are displayed on the screen at the time of a malfunction.

BRIEF DESCRIPTION OF THE DRAWINGS

The present information will be described below for the sake of example with preferred embodiments and figures. The figures show:

FIG. 4, a flow chart for the third embodiment.

Identical reference numbers in the figures designate identical or functionally identical elements.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
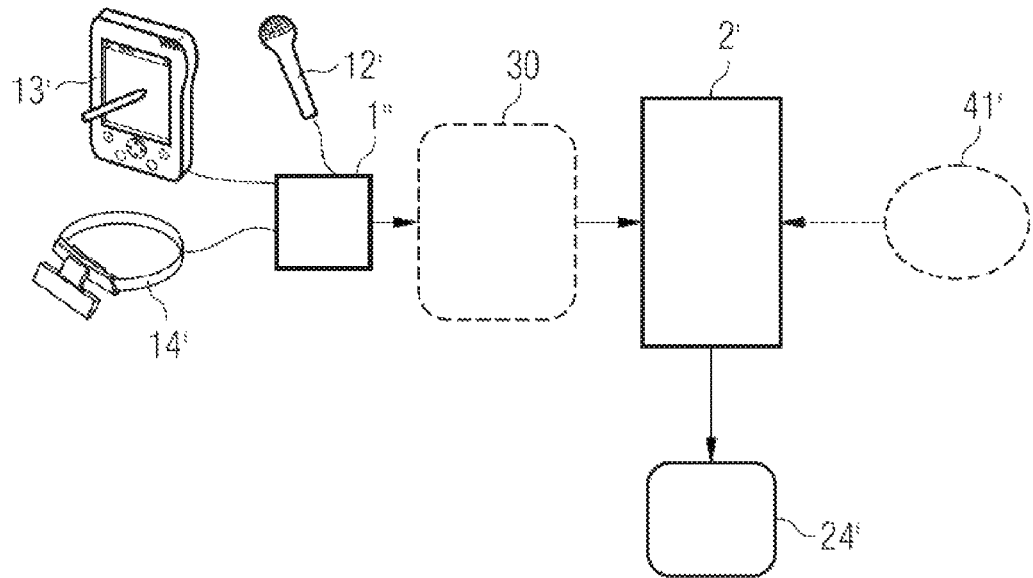
FIG. 1, a block diagram of a first embodiment.

A block diagram of a first embodiment is schematically represented in FIG. 1. A data processing unit 1", an office computer for instance, is connected to a plurality of user interfaces 12', 13', 14', also called man-machine interfaces. These user interfaces serve to convert information input by the user into data packages that can be further processed by the data processing unit. Such an input interface can be, for instance, a microphone 12' with a speech evaluation unit. The acoustic information of the user, which can contain command information, for instance, is recorded by the microphone and converted by the speech evaluation unit into the syntax of data processing unit 1". Analogously, a text acquisition unit 13' or a symbol acquisition unit can also be used, for example, as shown. Additional user interfaces for the input of information include gesture acquisition systems. An output unit 14' for communication of the computer with the user is also required as a user interface. This could comprise, for instance, a head-mounted display, a monitor or a speech output, as shown.

The raw data input by the user is referred to below as information, more precisely as input information. Analogously, the data of data processing unit 1" output to the user by the user interface in a form that can be acquired by the user is also referred to as information, more precisely as output information.

Input units 12', 13' are connected to data processing unit 1" in such a manner that their input information or output information is acquired by data processing unit 1". If required, additional acquisition units, not shown in FIG. 1, are provided here. For instance, a camera can record the image of a display unit in data processing unit 1" and transmit the filmed information.

Upon appearance of a fault, the user causes the information or raw data to be transmitted via an interface 30 to a fault elimination center 2". Fault elimination center 2" is connected to a database 41' in which a plurality of different patterns or pattern recognition routines are stored. The pattern recognition unit then checks the transmitted information against the stored patterns. If one of the patterns is contained in the information, a code number of the pattern is output.

Error handling routines are stored in another database (not shown). At least one pattern in the form of a code number is assigned to each of these error handling routines. The corresponding error handling routine is then selected from this database on the basis of the output code number. The selected error handling routine can be transmitted to the user or to data processing unit 1" via an interface 24'. The user either executes the transmitted error handling routine by following the indicated steps, or starts a routine that carries out the indicated steps.

Figure 2:
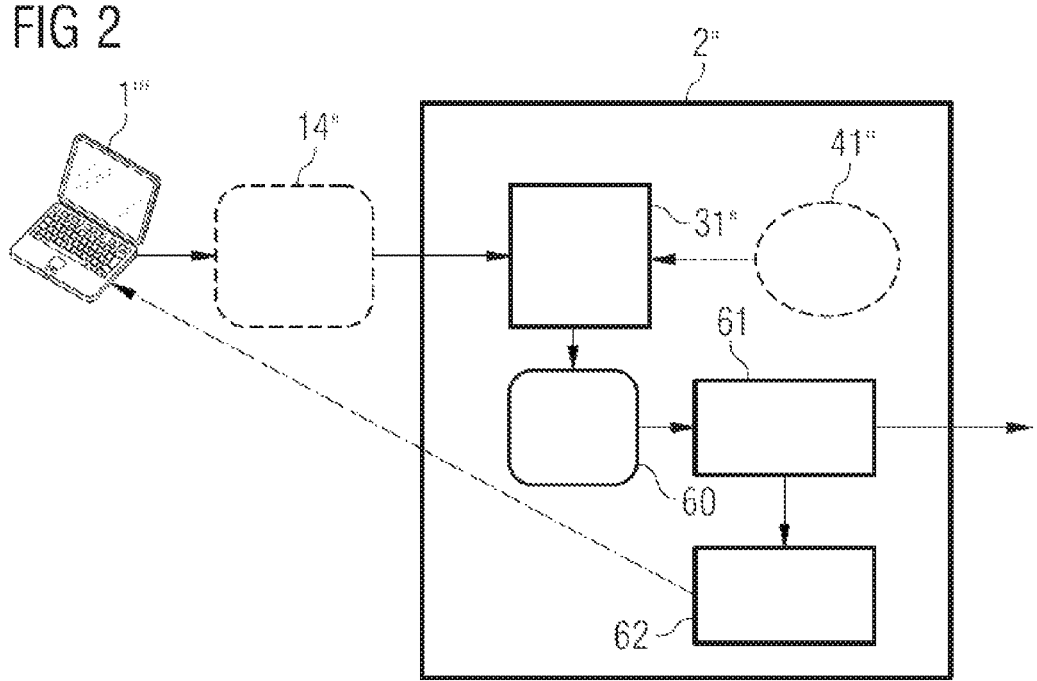
FIG. 2, a block diagram of a second embodiment.

A second embodiment of the present invention is presented as a block diagram in FIG. 2. A laptop, data processing unit 1''', stores the display screen contents upon appearance of an error message. These display screen contents 14'' are transmitted to a fault handling center 2''. Many elements are contained in the display screen information. They comprise graphic elements as well as text-based elements. Additionally, the most recently presented dialog elements are of particular interest. The text-based information is extracted by an appropriate text recognition unit 31'' and converted into data that can be further processed by fault handling center 2''. Text recognition unit 31'' can be combined with a modular interface 41''. This modular interface 41'', or database, contains a number of different text recognition routines. They can be set up in a specialized manner for different languages and language symbols. These comprise the English language with Latin characters, and the Chinese language with Chinese characters, etc. The modular text recognition unit allows universal processing of faults, independently of the language employed by the users.

Figure 3:
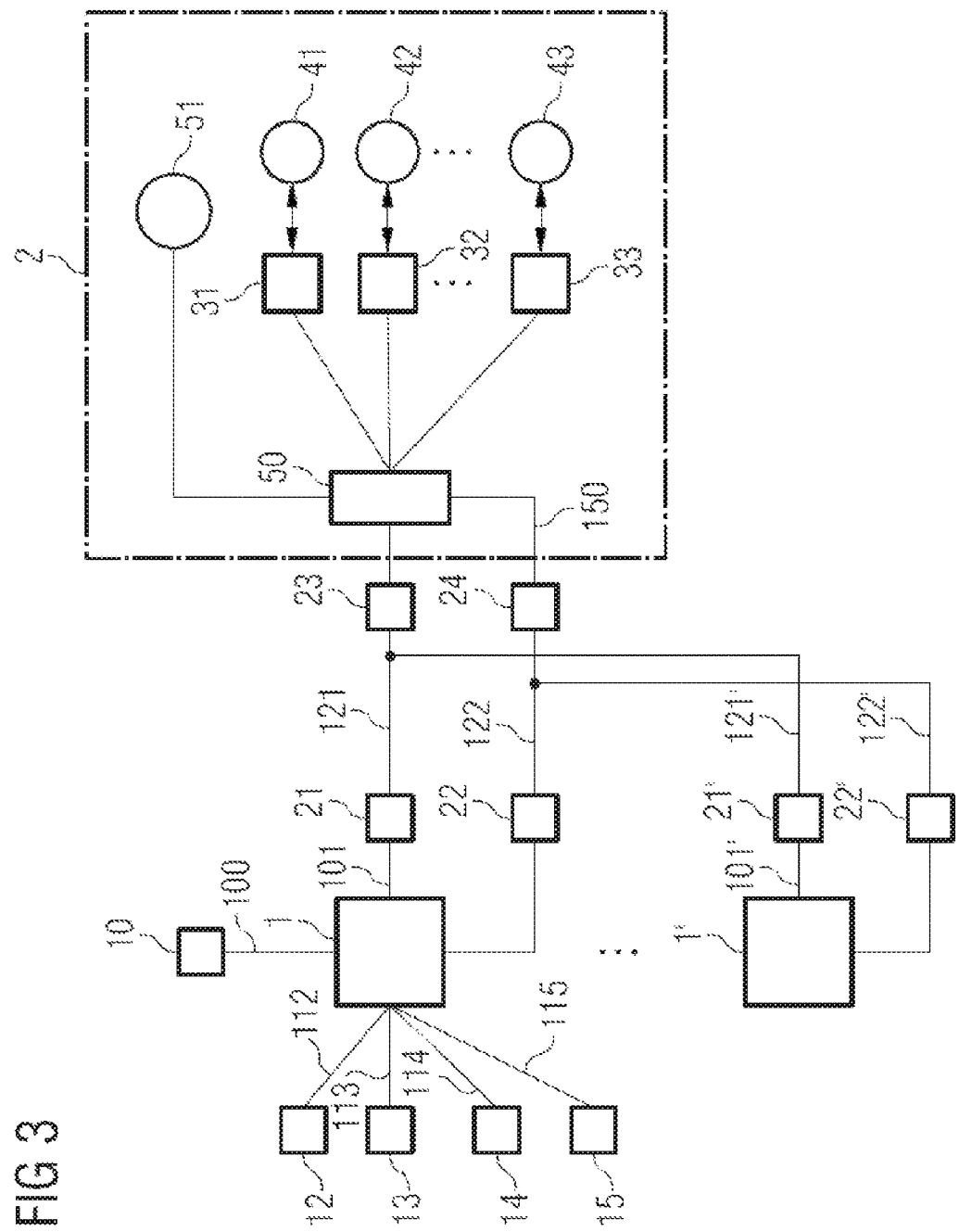
FIG. 3, a block diagram of a third embodiment.

A third embodiment is schematically shown as a block diagram in FIG. 3. A plurality of data processing units 1, 1'' are connected to a fault handling center 2. Data processing units 1, 1'' comprise personal computers, workstations, server stations, control consoles, etc. In a combination of processing units 1, 1'', units of the same type, or units of different types, can be combined with one another. The latter is probably the most commonly encountered case. Even in one office, the individual computers differ from one another in their hardware equipment and installed software components.

Each of these data processing units 1, 1'' is provided with a number of different input units and at least one output unit for communication with a user. Typical input devices 12, 13 comprise a keyboard or a mouse. Additional input units comprise touch-sensitive display screens or surfaces, graphics tablets, pen-based input systems with text recognition, acoustic input systems, for instance with voice recognition and gesture acquisition systems.

The above units are examples for a non-inclusive list of user interfaces for an input. The user interface converts the information provided by the user into data that can be further processed by data processing unit 1. In this embodiment, the input information 112, 113 is also transmitted unconverted, i.e., as raw data, to data processing unit 1, or is recorded by the latter.

An additional user interface 14, 15 is provided for the user in order to display the data output by data processing unit 1. The most common user interface for output is a video screen or a similar display. Additional output units can be a printing unit, a Braille line, etc. The data output by data processing unit 1 is converted by these user interfaces into information that can be perceived by the user. This displayed information 114, 115—output information—is acquired in the form in which it presents itself to the user, transmitted to the data processing unit 1, and recorded by the latter.

For this purpose, the video screen can be photographed by means of a camera, and this image or image sequence can be transmitted to data processing unit 1. With the display screen, it is also possible to acquire the video screen contents by means of a so-called screenshot.

Data processing unit 1 comprises a fault recognition unit 10, which outputs a fault message 100 to data processing unit 1. The fault recognition unit can be activated manually by the user if the latter is dissatisfied with the running of a computer program or the like. The fault recognition unit can also automatically recognize faulty behavior, such as endless loops, with a watchdog timer, and output the corresponding fault message 100.

After a message has been generated, data processing unit 1 transmits the input and output information to fault handling center 2. An interface 21 is provided for this purpose. The latter preferably encrypts the transmitted input and output information. This is necessary for security reasons, since it cannot be guaranteed that no security-relevant information components are contained in the input and output information. In place of an encryption, other channels secured against monitoring can be provided for transmitting information to fault handling center 2.

In addition to the input and output information, the state of the processors, the register entries from the processors, memory dumps, and so forth can be transmitted to fault handling center 2 as well. If available, log files or other output files of the individual applications can also be transmitted. An extremely wide variety of different data and information is provided in this manner for evaluating the fault.

Fault handling center 2 preferably comprises an input interface 23 that manages the communication with the individual data processing units 1, 1'. Suitable routers can be used for this purpose. The transmitted information is fed to an administration unit 50. It forwards the individual information items to specific pattern recognition units 31, 32, 33. The allocation takes place according to the type of information. A screenshot that is to be searched for a given character sequence is supplied to an appropriate pattern recognition unit 31 with integrated text recognition. The text recognition system communicates with a database 41 in which the words, sentence components, and sentences to be searched for are stored. This database 41 can be provided for many different languages. In this manner, fault handling center 2 is globally usable. Moreover, the text recognition unit can also be modularly interchangeable in order to be able to process with Latin, Cyrillic, Chinese or other Asian character sets. An unambiguous code or index is assigned to each of the words, sentence components or sentences to be recognized. If pattern recognition unit 31 recognizes one of these text elements in the transmitted information, the screenshot, for instance, this unambiguous code is transmitted to management unit 50.

Analogously to the pattern recognition unit with a text recognition system, units with a voice recognition unit 32, a symbol recognition unit 33, a gesture recognition unit, etc., can be provided. Corresponding databases 42, 43 with patterns to be found are provided for them.

Fault elimination center 2 is connected to a database 51, or contains a database, in which a wide variety of faults with associated unambiguous codes are stored. Furthermore, at least one possible error handling routine, which is assumed to be able to eliminate the fault, is provided for each fault. These error handling routines are generally determined by service personnel and input into the database.

From database 51, management unit 50 reads out those error handling routines whose unambiguous codes coincide with the codes transmitted to management unit 50 by pattern recognition units 31-33.

The read-out error handling routine 150 is transmitted via an output interface 24 to the corresponding data processing unit 1, 1'.

Depending on the error handing routine and the structure of data processing unit 1, 1', the error routine is automatically executed, or the user is instructed to carry out certain steps manually in order to eliminate the error underlying a fault.

FIG. 4 is a flow chart of the sequence of fault handling with the embodiment shown in FIG. 3. Information is recorded by a user interface. The application sequence of an application is monitored in parallel or sequentially, B. If a fault appears, C, the recorded information is transferred by data processing unit 1 to a fault handling center 2, D. Error handling routines for individual different possible faults are provided by the fault handling center, E. Additionally provided are pattern recognition units or pattern recognition methods which identify the corresponding faults on the basis of the transmitted information.

Suitable patterns or pattern recognition methods are provided for this purpose. The transmitted information is searched for the predetermined patterns or with the pattern methods, F, by the error processing center. If such a pattern of information is present and thereby identifies a given fault, the error handling method provided for eliminating this fault is read out of a database. This error handling routine is then transmitted to data processing unit 1. Processing unit 1 preferably executes the transmitted error handling routine automatically H.

Although the present invention was described on the basis of preferred embodiments, it is not limited thereto.

In particular, it is obvious to the person skilled in the art that elements which are described in only one of the three embodiments can also be used in the other embodiments.

What is claimed is:

1. A method for fault handling of a data processing unit, the method comprising:
    automatically acquiring a representation of a display unit of a data processing unit as visual output information of a user at at least one user interface of the data processing unit;
    automatically acquiring a fault message that indicates a fault of data processing unit;
    transmitting the acquired fault message together with the visual output information to a fault handling center;
    evaluating the transmitted fault message by:
        providing, in the fault handling center, a plurality of predetermined graphical patterns and a plurality of error handling routines associated with the predetermined graphical patterns;
        selecting, from the plurality of predetermined graphical patterns, those graphical patterns that are contained in the visual output information by a pattern recognition unit; and
        acquiring, by the fault handling center, the error handling routine associated with the selected graphical patterns from a plurality of error handling routines;
    transmitting the acquired error handling routine to data processing unit for handling the fault.

2. The method according to claim 1, further comprising automatically acquiring input information of the user as raw data at the at least one user interface, wherein transmitting the acquired fault message comprises transmitting the input information, and the step of selecting comprises selecting those patterns that are contained in the input information.

3. The method according to claim 2, wherein automatically acquiring input information comprises automatically acquiring a speech input as acoustic input information, the method further comprising acquiring text contents from the acoustic input information by means of a speech recognition unit.

4. The method according to claim 3, wherein the error handling routine whose associated text-based pattern is contained in the text contents is acquired.

5. The method according to claim 3, wherein that the text contents are translated into a standard language by means of a translation machine for acquiring the pattern contained in the text contents, and/or the text-based pattern associated with an error handling routine is provided in a plurality of languages.

6. The method according to claim 1, further comprising executing the transmitted error handling routine at the data processing unit.

7. The method according to claim 1, further comprising storing the transmitted fault message and the output information in a database of the fault handling unit.

8. The method according to claim 7, comprising outputting a system notification, if the most recently transmitted fault message with output information does not correspond to any of the previously stored fault messages.

9. The method according to claim 1, wherein the output information further includes text content that is acquired by means of a text recognition unit.

10. The method according to claim 9, wherein the error handling routine whose associated text-based pattern is contained in the text contents is acquired.

11. The method according to claim 9, wherein that the text contents are translated into a standard language by means of a translation machine for acquiring the pattern contained in the text contents, and/or the text-based pattern associated with an error handling routine is provided in a plurality of languages.

12. A method for fault handling of a data processing unit, the method comprising:
    receiving a fault message together with visual information from a data processing unit, the visual information comprising output information that has been automatically acquired from a user interface of the data processing unit;
    converting the visual information to text providing a plurality of predetermined patterns and a plurality of error handling routines associated with the predetermined patterns;
    selecting, from the plurality of predetermined patterns, those patterns that are contained in the visual information from the data processing unit;
    acquiring an error handling routine associated with the selected patterns from a plurality of error handling routines; and
    transmitting the acquired error handling routine to data processing unit.

13. The method according to claim 12, wherein receiving a fault message together with visual information from a data processing unit comprises receiving encrypted data.

14. The method according to claim 12, further comprising performing a speech recognition process to convert the acoustic information to text.

15. The method according to claim 12, wherein the visual information comprises at least one screen shot.

16. An apparatus for fault handling of a data processing unit, the apparatus comprising:
    at least one acquisition unit for acquiring a representation of a display unit of the data processing unit as visual output information of a user at a user interface in the data processing unit;
    a fault acquisition unit for acquiring a fault message that indicates a fault in the data processing unit;
    a first interface for transmitting the acquired fault message together with the visual output information to a fault handling unit; and
    an evaluation unit in the fault handling unit for evaluating the transmitted fault message, the evaluation unit comprising:

a database for providing a plurality of predetermined graphical patterns and a plurality of error handling routines associated with the predetermined graphical patterns;

at least one pattern recognition unit for selecting, from the plurality of predetermined graphical patterns, the graphical patterns that are contained in the visual output information;

a fault handling center for acquiring the error handling routine associated with the selected graphical patterns from the database: and a second interface for transmitting the acquired error handling routine to data processing unit for handling the fault.

17. The apparatus according to claim 16, wherein the first interface between data processing unit and fault handling center provides an encrypted connection.

* * * * *